(12) United States Patent
Matsumiya

(10) Patent No.: US 6,563,899 B1
(45) Date of Patent: *May 13, 2003

(54) NEUTRON MONITORING SYSTEM

(75) Inventor: Shoichi Matsumiya, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/278,787

(22) Filed: Oct. 24, 2002

Related U.S. Application Data

(63) Continuation of application No. 09/942,695, filed on Aug. 31, 2001.

(51) Int. Cl.$^7$ ............................................. G21C 17/00
(52) U.S. Cl. ........................ 376/254; 376/245; 376/260
(58) Field of Search ............................... 376/254, 245, 376/260; 250/390.01, 391, 392

(56) References Cited

U.S. PATENT DOCUMENTS

| | | | | | |
|---|---|---|---|---|---|
| 3,579,127 A | * | 5/1971 | Thomas | ................. | 250/390.01 |
| 3,710,112 A | * | 1/1973 | Caldwell et al. | ......... | 250/269.6 |
| 4,471,435 A | * | 9/1984 | Meisner | ...................... | 250/262 |
| 4,476,391 A | * | 10/1984 | Bednarczyk | ........... | 250/390.01 |
| 4,920,548 A | * | 4/1990 | Gaussa et al. | ............... | 376/255 |
| 5,160,844 A | * | 11/1992 | Albats | .................... | 250/390.01 |
| 5,295,166 A | * | 3/1994 | Oda | ........................... | 376/255 |
| 5,347,129 A | * | 9/1994 | Miller et al. | ........... | 250/390.07 |

FOREIGN PATENT DOCUMENTS

| | | | | |
|---|---|---|---|---|
| JP | 01244396 | * | 9/1989 | .................. 376/245 |
| JP | 06-217357 | | 8/1994 | |
| JP | 09274095 | * | 10/1997 | .................. 376/255 |

* cited by examiner

Primary Examiner—Michael J. Carone
Assistant Examiner—Daniel Matz
(74) Attorney, Agent, or Firm—Crowell & Moring LLP

(57) ABSTRACT

The neutron monitoring system measures neutrons by counting both the negative pulse signals and the positive noise pulse signals output from a neutron detector 1, and subtracts the positive pulse count from the negative pulse count per unit time, thereby measuring the neutrons.

2 Claims, 4 Drawing Sheets

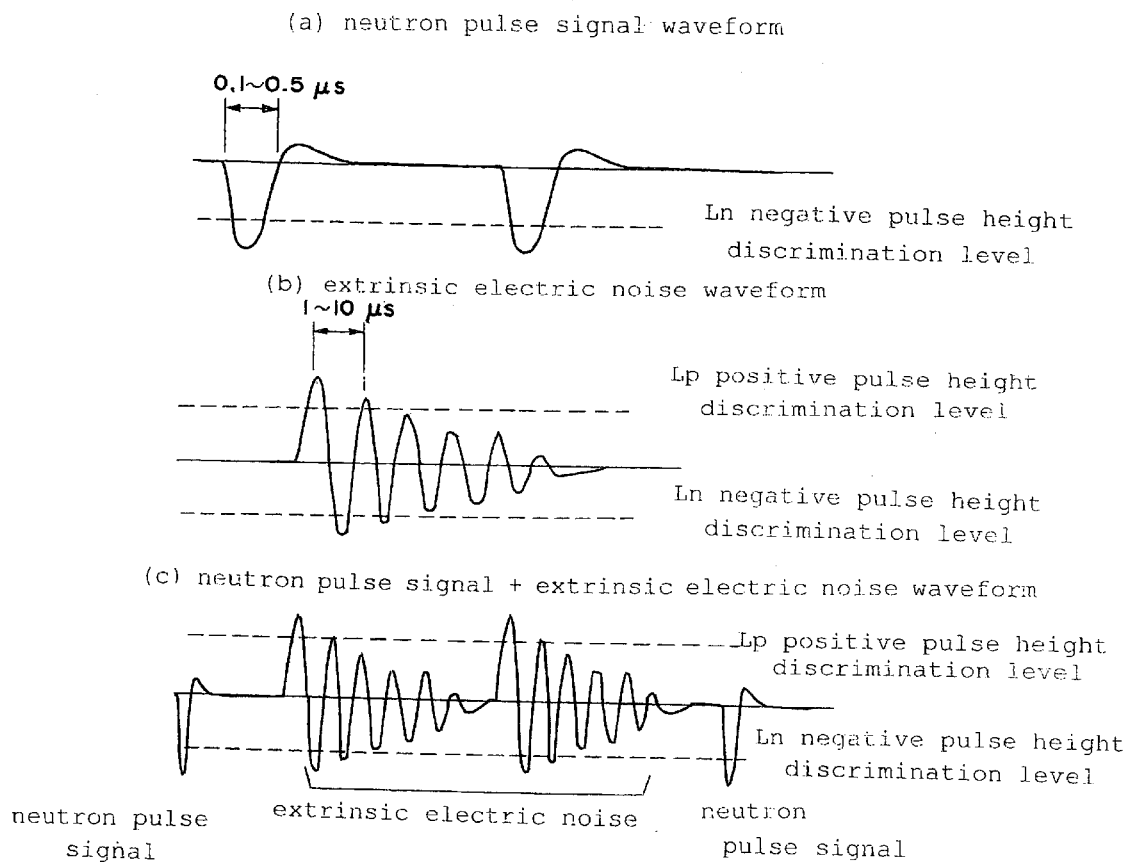

Fig. 4

(a)
```
              Pulse count rate display example
Self test : Normal
Pulse count rate                                    ***CPS
Noise pulse count rate                              ***CPS
Measured signal status : Normal
Pulse count rate with noise eliminated              ***CPS
Trip output : None
```

(b)
```
              Pulse count rate display example
Self test : Normal
Pulse count rate                                    ***CPS
Noise pulse count rate                              ***CPS
Measured signal status : Anomaly
Pulse count rate with noise eliminated              ***CPS
Trip output : None
```

(c)
```
              Pulse count rate display example
Self Test : Normal
Pulse count rate                                    ***CPS
Noise pulse count rate                              ***CPS
Measured signal status : Normal
Pulse count rate with noise eliminated              ***CPS
Trip output : high count rate
```

NEUTRON MONITORING SYSTEM

This application is a continuation of application Ser. No. 09/942,695, filed Aug. 31, 2001.

FIELD OF THE INVENTION

The present invention relates to a neutron monitoring system for detecting neutron fluxes using a neutron detector that outputs pulse signals upon detecting the neutron flux.

Heretofore in a nuclear power plant, the nuclear reactor output is monitored by counting the number of pulse signals being output from a neutron detector per unit time. The neutron detector generates negative pulse signals.

The pulse signals generated from the neutron detector is normally converted and amplified by a pre-amplifier into voltage pulse signals, and pulse height discrimination is performed thereto. When the negative pulse signal is smaller (greater in absolute value) than the preset value, the pulse height discrimination determines that the signal is a neutron flux detection pulse signal, and thus the influence of noises is removed.

However, welding work is performed during periodic inspection in the nuclear power plant, generating electric noise signals (surge noises) greater than the pulse height discrimination level (preset value). Therefore, the electric noise signals are counted as the detection pulse signals of the neutron flux, causing pulse rate counting error. The electric noise signals are generated both in positive and negative polarities.

In order to prevent the pulse rate counting error caused by the surge noises when measuring the neutron flux, pulse height discrimination of the noise signal in the positive polarity is performed so as to detect the noise signal, and when a noise signal is detected, the count rate of the neutron detection pulse signals is corrected. According to the count rate correction, when a noise signal is detected, the counting of the neutron detection pulse signals is stopped for a predetermined time. Such system is disclosed for example in Japanese Patent Laid-Open Publication No. 8-82681.

SUMMARY OF THE INVENTION

According to the prior art system, when a noise signal is detected during measurement of pulse counts per unit time, the counting of the neutron detection pulse signals is stopped for a predetermined time. The unit time of measurement cycle in a digital neutron measurement device is approximately 200 ms. The count of the neutron detection pulse signals ranges between 10 and $10^6$.

Accordingly, if the counting of signals is stopped for a predetermined time when there is a great number of neutron detection pulse signals being output, the measurement accuracy is deteriorated greatly, and when plural noise signals are detected within a unit time, it becomes impossible to count the signals.

The present invention aims at solving the problems of the prior art mentioned above, and the object of the invention is to provide a neutron monitoring system capable of measuring the neutron fluxes reliably with high accuracy.

The present invention characterizes in counting the negative pulse signals output from the neutron detector and also counting the positive noise pulse signals, and subtracts the positive pulse count from the negative pulse count per unit time in order to measure the neutrons.

In other words, the present invention determines the negative pulse count by subtracting the positive pulse count or noise pulses from a negative pulse count which is the sum of noise pulses and neutron flux detection pulses counted within a measurement cycle per unit time, and sets the negative pulse count as the measured neutron value.

The present invention measures the neutrons based only on the negative pulse signals corresponding to the pulse signals output when the neutron fluxes are detected, by canceling the noise pulses detected in both positive and negative polarities. Therefore, the invention enables to measure the neutrons with high accuracy without being influenced by the number of noise pulses detected per unit time.

BRIEF DESCRIPTION OF THE DRAWINGS

FIG. 3 shows waveforms for explaining the invention; and

FIG. 4 shows an example of the display screen of the display device of the neutron monitoring system according to the invention.

DETAILED DESCRIPTION OF PREFERRED EMBODIMENTS

The embodiments of the present invention will now be explained with reference to the drawings.

Figure 1:
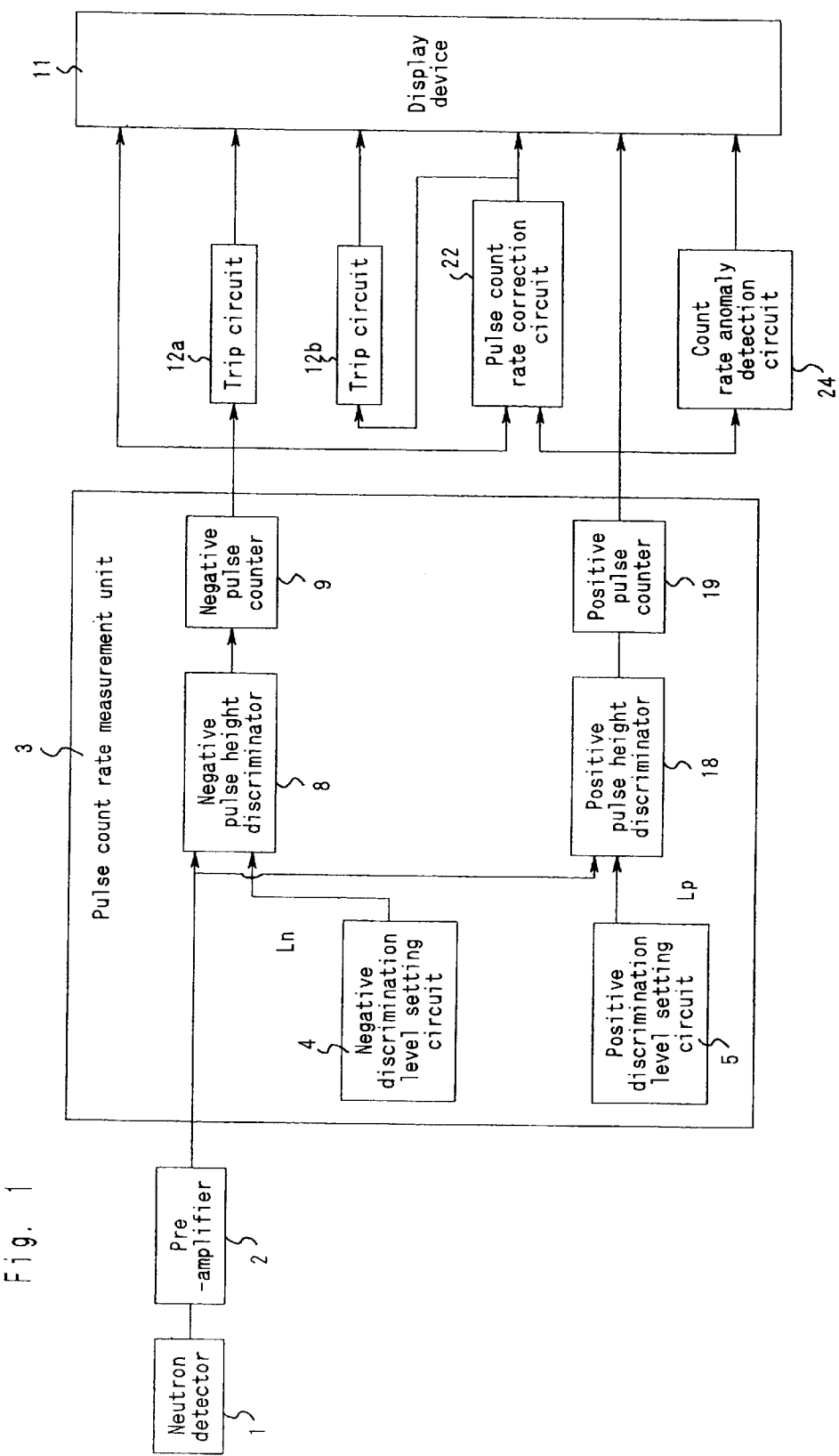
FIG. 1 is a block diagram showing one embodiment of the invention.

FIG. 1 shows one embodiment of the invention.

In FIG. 1, the current pulse signals output from a neutron detector 1 are converted and amplified into voltage pulse signals at a pre-amplifier 2 before being input to a pulse count rate measurement unit 3. The current pulse signals output from the neutron detector 1 are negative.

The voltage pulse signals (negative neutron signals) output from the pre-amplifier 2 is input to a negative pulse height discriminator 8 that constitutes the pulse count rate measurement unit 3. The negative pulse height discriminator 8 is provided with a negative discrimination level Ln for measuring the negative pulse count of the neutron signals. When the voltage pulse signal is smaller (greater in absolute value) than the negative discrimination level Ln, the negative pulse height discriminator 8 outputs a pulse signal to add to a negative pulse counter 9.

In a positive pulse height discriminator 18, the positive discrimination level Lp is set by a positive discrimination level setting circuit 5 for measuring the positive pulses caused by excessive extrinsic electric noises. The discriminator 18 outputs a pulse signal when the noise pulse signal exceeds the positive discrimination level Lp to add to a positive pulse counter 19.

The discrimination level setting circuits 4 and 5 for negative pulse count measurement and positive pulse count measurement each sets the negative or positive pulse height discrimination level Ln or Lp as shown in FIG. 3(b).

The pulse count of the negative pulse counter 9 is provided to a display device 11, a trip circuit 12a, and a pulse count rate correction circuit 22. Further, the output of the pulse count rate correction circuit 22 is provided to the display device 11 and a trip circuit 12b.

The pulse count of the positive pulse counter 19 is provided to the display device 11, the pulse count rate correction circuit 22 and a count rate anomaly detection circuit 24, and the output of the count rate anomaly detection circuit 24 is provided to the display device 11. The output of the trip circuits 12a and 12b are provided to the display device 11.

Figure 2:
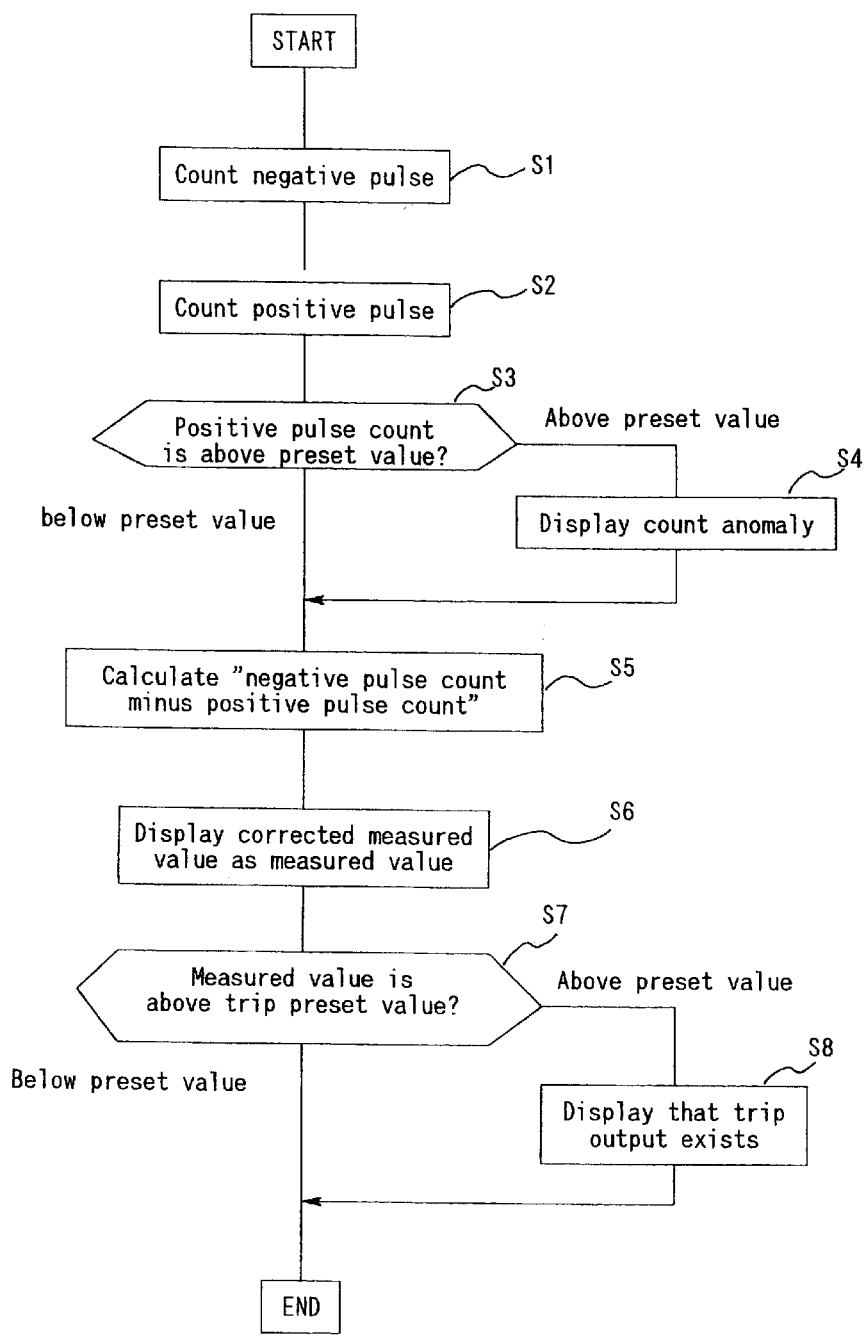
FIG. 2 is a flowchart explaining the operation of the invention.

Next, the operation mentioned above is explained with reference to the flowchart of FIG. 2.

The current pulse signal shown in FIG. 3(a) output from the neutron detector 1 for detecting the neutron flux density is converted and amplified into a voltage pulse signal by the pre-amplifier 2 before being input to a negative pulse height discriminator 8 constituting the pulse count unit 3. The negative pulse height discriminator 8 outputs a pulse signal when the voltage pulse signal is smaller (greater in absolute value) than the negative discrimination level Ln to add to the negative pulse counter 9.

On the other hand, the positive pulse height discriminator 18 provides a pulse signal to the positive pulse counter 19 that counts the pulses when the noise pulse signal exceeds the positive discrimination level Lp.

In step S1 of the pulse count unit 3, the negative pulse counter 9 counts the number of negative pulses, and in step S2, the positive pulse counter 19 carries out the count-rate process of the positive pulses.

In step S3, the count rate anomaly detection circuit 24 compares the counted value of the positive pulses counted by the positive pulse counter 19 with a preset value. If the counted value does not reach the preset value, the procedure advances to step 5, and if the counted value is equal to or greater than the preset value, the procedure advances to step 4. In step S4, the count rate anomaly detection circuit 24 displays the count rate anomaly on the display device. Normally, when no electric noise exists, there is no count rate anomaly displayed on the display device 11, but when electric noise pulses exceeding a certain level is mixed in, the count rate anomaly is displayed on the display device 11.

In step S5, the pulse count rate correction circuit 22 inputs the negative pulse count rate of the negative pulse counter 9 and the positive pulse count rate of the positive pulse counter 19, and computes "negative pulse count—positive pulse count" to correct the measured value, and thereafter in step S6, the corrected measured value (count rate) is displayed as the measured value on the display device 11.

In step S7, the trip circuit 12 compares the corrected measured value with the trip preset value, and if the corrected measured value has not reached the trip preset value the procedure is terminated, and if the corrected measured value is equal to or greater than the trip preset value, the procedure advances to step 8. In step 8, the trip circuit 12 displays on the display device 11 that trip output exists.

This is how the neutron measurement is performed, but normally, there exists no excessive extrinsic electric noise, so only the negative neutron pulses are counted by the negative pulse counter 9.

If excessive extrinsic electric noise is generated and the negative pulse counter 9 counts the neutron pulses and the electric noise pulses, not only the negative pulse count rate but also the positive pulse count rate measured by the positive pulse counter 19 is displayed simultaneously on the display device 11.

Further, the count rate anomaly detection circuit 25 compares the positive pulse count rate with the preset value, and when the positive pulse count rate exceeds the preset value, it displays a count rate anomaly detection result on the display device 11.

By looking at the display device 11, the operator can determine easily that the increase in negative pulse count rate is caused by the electric noise.

Thereafter, when the electric noise disappears and the decrease in negative pulse count rate is displayed on the display device 11, the decrease in the positive pulse count rate measured by the positive pulse counter 19 is simultaneously displayed on the screen. Further, since the positive pulse count rate becomes smaller than the preset value, the count rate anomaly detection circuit 24 clears the count rate anomaly detection result and outputs the result to the display device 11, so it is shown on the display that the state is normal. According to these operations, it could easily be judged that the decrease in the negative pulse count rate is caused by the disappearance of the electric noise.

As explained above, even if excessive extrinsic electric noise with shorter intervals than the signal pulse width is mixed into the pulse signals continuously, the present invention detects and displays the occurrence of the electric noise by counting the positive pulses, and moreover, detects and displays the variation of the positive pulse count rate simultaneously when detecting and displaying the variation of the negative pulse count rate accompanying the occurrence and disappearance of the extrinsic electric noise. Accordingly, the present invention enables the operator to confirm the status of the system easily and to determine that the fluctuation of the counted value is caused by electric noises.

Next, the function of correcting the pulse count rate according to the present invention is explained.

The negative pulse height discrimination level Ln and the positive pulse height discrimination level Lp are set in advance as shown in FIG. 3(b) so that the negative pulse count and the positive pulse count of the extrinsic electric noises are equal when no neutron signal exists. The pulse count rate correction circuit 22 carries out an operation to subtract the positive pulse count from the negative pulse count. Thereby, even when electric noise is superposed continuously over the neutron pulse signals with smaller intervals than the signal pulse width as shown in FIG. 3(c), the pulse count rate correction circuit 22 is capable of computing the corrected count rate excluding the fluctuation of the pulse count rate caused by the influence of the electric noises. This corrected count rate is displayed on the display device 11.

Moreover, a trip circuit 12a and a trip circuit 12b are provided to correspond to the count rate before the correction and the count rate after the correction, and the trip output status is displayed on the display device 11, thereby enabling the operator to understand the status related to the electric noise more accurately.

As explained above, even if excessive extrinsic electric noise having a shorter interval than the signal pulse width is mixed into the pulses, the present invention enables to measure the pulse count rate stably without being influenced by the noise. Accordingly, the present invention improves the reliability of the neutron flux measurement.

FIGS. 4(a) through (c) show examples of the screen displaying the negative pulse count rate together with the positive pulse count rate and the corrected pulse count rate according to the present invention.

FIG. 4(a) is a display screen example of the display device 11 showing the case where no noise exists in the input signal and no trip output of the "high" count rate exists. FIG. 4(b) is a display screen example of the display device 11 showing the case where the negative pulse count rate is increased since noise signals are mixed into the input signal, but the function to correct the pulse count rate enables to compute the correct count rate, so no high count rate trip output exists. FIG. 4(c) shows the displayed screen example of the display device 11 showing the case where no noise signal exists in the input signal, but the actual count rate exceeds the trip value, so therefore a high count rate trip is output.

The measurement is performed as mentioned, and the counting of positive noise pulse signals are performed simultaneously when counting the negative pulse signals output from the neutron detector, and the positive pulse count per unit time is subtracted from the negative pulse count per unit time so as to measure the neutrons. In other words, the negative pulse count rate computed by subtracting the positive pulse count rate (noise pulses) from a negative pulse count rate that is the sum of the noise pulses and the neutron flux detection pulses counted within a measurement cycle of a unit time is set as the neutron measurement value.

According to the present invention, the noise pulses detected in both positive and negative polarities are cancelled so that the count of the negative pulse signals corresponding to the detection pulse signals of the neutron flux is obtained for neutron measurement. Therefore, the neutrons can be measured with high accuracy without being influenced by the number of noise pulses that are mixed in per unit time.

I claim:

1. A neutron monitoring method comprising the steps of:

counting negative pulse signals output from a neutron detector that outputs negative pulse signals upon detecting neutron flux;

counting positive pulse signals from the neutron detector; and measuring the neutrons based on said negative pulse signals and said positive pulse signals so as to reduce influence by noise pulses.

2. A neutron monitoring system comprising:

a neutron detector that outputs negative pulse signals upon detecting neutron flux;

a first pulse count rate measurement means provided with the pulse signals output from said neutron detector for counting the negative pulses per unit time;

a second pulse count rate measurement means provided with the output pulse signals from said neutron detector for counting positive pulses per unit time; and a pulse count correction means for obtaining a corrected count rate excluding the fluctuation of the pulse count rate caused by the influence of the electric noises, by computing a pulse count of first pulse count rate measurement means and a pulse count of said second pulse count rate measurement means.

* * * * *